Nov. 21, 1950

H. G. DE FRANCE ET AL

TELEVISION DEVICE FOR RECORDING MOTION PICTURES THEREOF

Filed Oct. 28, 1947

2,531,031

INVENTOR
Henri Georges DeFrance
Rene Bocquel
BY
Bailey, Stephens & Huettig
ATTORNEYS Patented Nov. 21, 1950

2,531,031

UNITED STATES PATENT OFFICE 2,531,031

TELEVISION DEVICE FOR RECORDING MOTION PICTURES THEREOF

Henri Georges de France and René Bocquel, Paris, France, assignors to Tele-Industrie S. A. R. L., Paris, France, a society of the Republic of France Application October 28, 1947, Serial No. 782,650
In France September 24, 1947

3 Claims. (Cl. 178—5.2)

Figures 1, 2:
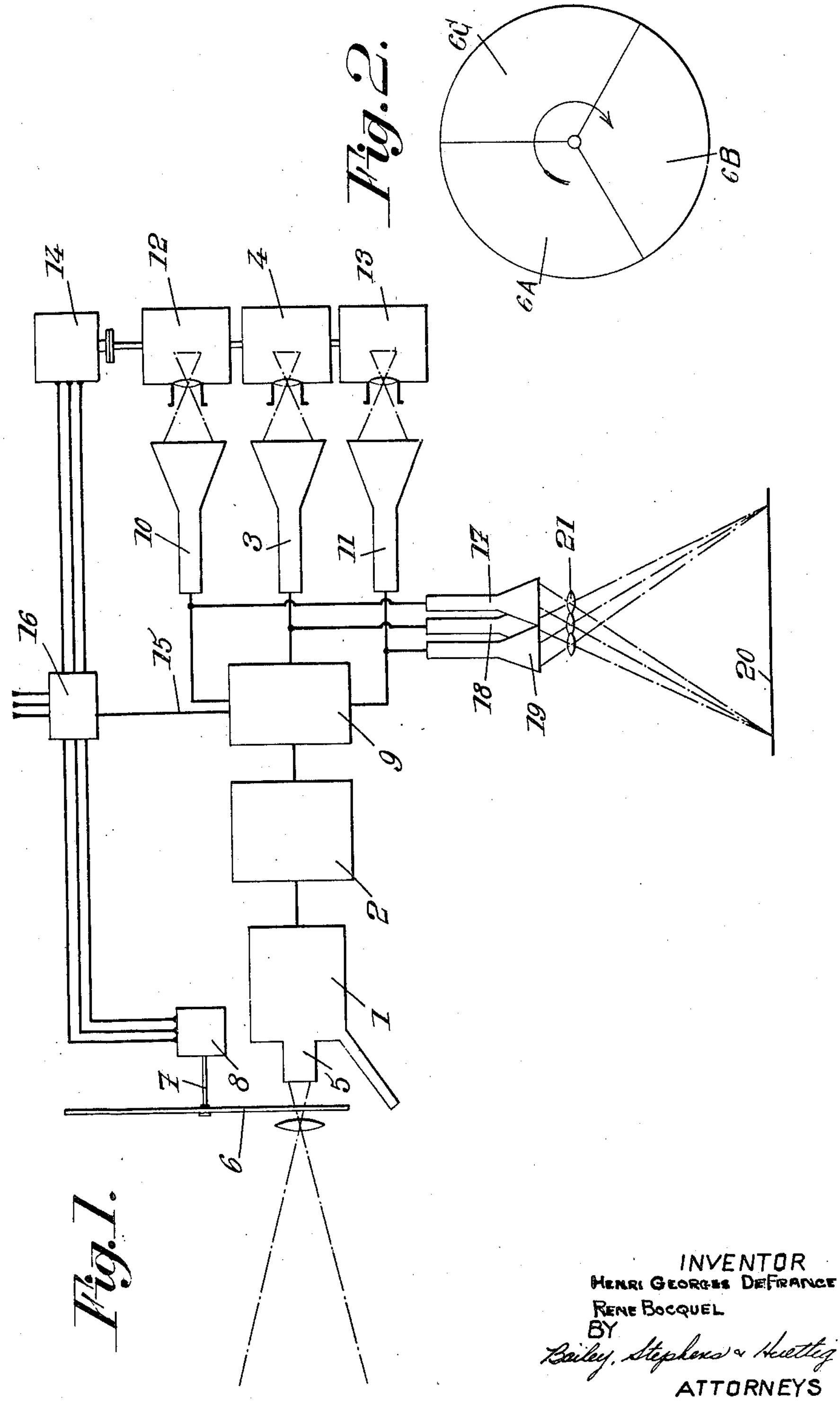

The present invention relates to the recording of motion pictures, and it is more particularly but not exclusively concerned with the obtainment of coloured films.

Its chief object is to provide a system of this kind which is better adapted to meet the requirements of practice than those used for the same purpose up to this time.

A preferred embodiment of our invention will be hereinafter described, with reference to the accompanying drawings, given merely by way of example, and in which:

Fig. 1 diagrammatically shows a colour cinematographic recording system according to our invention;

Fig. 2 is a front view of the selector disc of this system.

According to our invention, the scene to be filmed is analyzed by means of a television camera 1 in which the image of the scene is transformed into corresponding modulated electric currents.

This camera is connected with an amplifier 2 from which currents are supplied to a cathode ray tube analyser 3 on the screen of which the image of the scene appears. We provide in front of this tube 3 a cinematographic camera 4, for instance of the conventional type, and we record on the film of this camera the image formed on the screen of tube 3.

Of course, we may have recourse to any suitable type of television cameras 1 to record the scene.

Concerning cathode ray tube 3, the fluorescent layer of its screen is preferably constituted in such manner that the image that is produced has a luminescence which is in the zone of maximum sensitivity of the film that is used.

Such a system, in addition to the fact that it has the advantage of requiring a lower illumination of the scene to be recorded, further permits of acting upon the quality of the image supplied on screen 3 (brightness, contrast) by means of devices included in amplifier 2 and of adapting the recording to circumstances. It is possible directly to film scenes which it would be difficult or even impossible to film through the usual methods.

Advantageously, the above described arrangement is used for obtaining colour moving pictures.

For this purpose, we interpose between the camera and the scene to be filmed a system of selection filters which are successively brought into action and, by means of an electronic switch mounted on the output side of the camera and synchronized with the movement of the selector filters, we direct the currents from this camera successively toward a number of oscilloscopes equal to the number of filters. Finally, we record on respective films, by means of distinct motion picture cameras, the images supplied by these oscilloscopes. These various cameras, synchronized with the movement of the selector filters work in suitable phase sequence to one another.

For instance, and supposing that it is desired to obtain a three colour selection on three separate films, we mount in front of the objective 5 of camera 1 a disc 6 the axis 7 of which is parallel to the optical axis of objective 5.

This disc includes three equal sectos 6A, 6B, 6C (extending each over 120°) constituted by transparent filters each coloured in one of the three colours A, B, C of the chosen selection.

The shaft 7 of disc 6 is driven by means of a motor 8 connected to a suitable current source.

The output of a amplifier 2 is supplied to a switch 9 (preferably an electronic switch) with three outputs in phase difference of $$\frac{2\pi}{3}$$

and respectively connected with analyzer tubes 10, 3 and 11.

Opposite the screen of the three tubes in question, we provide three motion picture cameras 12, 4, 13, driven by a common motor 14 connected to the same source of current as motor 8.

Motors 8 and 14 rotate for instance the first at the rate of 72 revolutions per second, the second at the rate of 24 revolutions per second (conventional rate for recording moving pictures).

Finally, we synchronize switch 9 with both motors 8 and 14 (which are themselves synchronized due to the fact that they are supplied from the same source of current) by connecting it through line 15 with a device 16 responsive for instance to the frequency of the motor feed current.

In these conditions, during every revolution of disc 6, the image formed on the sensitive plate or camera 1 corresponds successively to the three selected images in colours A, B, C.

After amplification at 2, the currents corresponding to these images are directed, respectively and successively, through switch 9, to the three oscilloscopes 10, 3 and 11. Thus, synchronism and phase setting being supposed to be correct, tube 10 always supplies on its screen an image corresponding to the same colour, A for instance; tube 3 likewise supplies an image corresponding to colour B; and tube 11 always supplies an image corresponding to colour C.

If care is taken to set the three cameras 12, 4, 13 in suitable phase difference to one another, camera 11, during its opening, will record the image selected to correspond to colour A. Likewise camera 4 will record the image corresponding to colour B and camera 13 the image corresponding to colour C.

We thus obtain three films representing the same scene but with the interposition of filters corresponding to the three elementary colours that have been chosen.

Preferably we provide the system with control means, which can be made as follows:

In addition to tubes 10, 3, 11, we make use of three other tubes 17, 18, 19, fed with the same currents, respectively, as 10, 3 and 11, and provided with screens the respective fluorescences of which are coloured in colours A, B, C.

The images of these three screens are projected on an opaque screen 20. These images being combined by means of three suitably disposed objectives 21 or of a composite objective equivalent thereto.

On screen 20 we can then see an image of the scene reconstituted in colours; this permanent control permits of acting upon the brightness and contrast control devices, included in amplifier 2 for ensuring the best possible reproduction.

Of course, it is of interest to choose, for the screens of tubes 3, 10, 11, fluorescent substances corresponding to the maximum of sensitiveness of the films that are utilized; therefore it does not seem necessary to use panchromatic films since it is possible to choose fluorescent substances the chromatic response of which is sufficient with non-panchromatic films.

Having thus obtained negative films, we obtain positives therefrom for instance through one of the known methods.

But it seems advantageous, in order to obtain these positives, to apply our above mentioned method and to record by means of a television camera images of the negative so as to obtain this negative image on a receiver screen 3 so that camera 4 directly gives a positive.

If several positive copies are desired, amplifier 2 is caused to supply several tubes such as 3 and the respective images on the screens of these tubes are filmed.

According now to another feature of our invention we directly obtain positive films by providing the contrast control device included in amplifier 2 with slope reversing means.

In this case, the images formed on the screens of tubes 10, 3, 11 are true negatives of the scene to be reproduced; consequently, after developing, the films of cameras 12, 4, 13 will give positive pictures.

In this case also, it is possible suitably to adjust the brightness and contrast of these images.

According to a modification, the coloured image supplied by the three control tubes 17, 18, 19 are filmed through suitable means, either on opaque screen 20, or, preferably, by filming the aerial real image supplied in the plane thereof by objectives 21.

Our system has many advantages, in particular:

That of permitting the simultaneous obtainment of several films corresponding to the same scene;

That of giving at will positive or negative images and this in any desired number;

That of permitting in a particularly easy manner adjustment of the brightness and contrast of the images;

That of including devices which are wholly silent (the whole of the amplifier, the switch, the tube and cinema camera, may be located at a relatively great distance from recording camera 1, and even, eventually, connected therewith through radio link instead of wire links); and That of giving the possibility of faking in a very easy way by using of several recording cameras working simultaneously and mixing the currents produced by these cameras, the possibilities of electronic mixing being practically unlimited.

In a general manner, while we have, in the above description, disclosed what we deem to be practical and efficient embodiments of the present invention, it should be well understood that we do not wish to be limited thereto as there might be changes made in the arrangement, disposition and form of the parts without departing from the principle of the present invention as comprehended within the scope of the appended claims.

What we claim is:

1. A color cinematograph recording device which comprises, in combination, a television camera, means for passing a plurality of color filters, successively and according to a given cycle, in front of the objective of said camera, an amplifier connected to the output of said camera, a plurality of television receivers including each an image tube, the number of receivers being equal to that of filters, a switch interposed between said amplifier and said receivers and synchronized with the filter passing means, for operating each receiver successively while a corresponding filter is passing in front of said camera, a plurality of motion picture cameras, each motion picture camera focused on one image tube screen, respectively, and means operatively connected with said switch for operating said motion picture cameras successively to record the respective images traced on said screens as they are being scanned.

2. A system according to claim 1 further including, between said television camera and said switch, contrast control means adapted to act as slope reversing means.

3. A color cinematograph recording device which comprises, in combination, a television camera, means for passing a plurality of colour filters, successively and according to a given cycle, in front of the objective of said camera, an amplifier connected to the output of said camera, a plurality of television receivers including each an image tube, the number of receivers being equal to that of filters, a switch interposed between said amplifier and said receivers and synchronized with the filter passing means, for operating each receiver successively while a corresponding filter is passing in front of said camera, a plurality of motion picture cameras, each motion picture camera focussed on one image tube screen respectively, and means operatively connected with said switch for operating said motion picture cameras to record the respective images formed on said screens as said images are visible.

HENRI GEORGES DE FRANCE.
RENÉ BOCQUEL.

REFERENCES CITED

The following references are of record in the file of this patent:

UNITED STATES PATENTS

| Number | Name | Date |
| --- | --- | --- |
| 2,073,370 | Goldsmith | Mar. 9, 1937 |
| 2,253,292 | Goldsmith | Aug. 19, 1941 |
| 2,373,114 | Goldsmith | Apr. 10, 1945 |
| 2,420,029 | Brady | May 6, 1947 |